(12) United States Patent
Dhaliwal et al.

(10) Patent No.: US 12,539,023 B2
(45) Date of Patent: Feb. 3, 2026

(54) IMAGING METHOD AND APPARATUS

(71) Applicant: The University Court of the University of Edinburgh, Edinburgh (GB)

(72) Inventors: Kev Dhaliwal, Edinburgh (GB); Michael G. Tanner, Edinburgh (GB); Robert R. Thomson, Edinburgh (GB)

(73) Assignee: The University Court of the University of Edinburgh, Edinburgh (GB)

( * ) Notice: Subject to any disclaimer, the term of this patent is extended or adjusted under 35 U.S.C. 154(b) by 1282 days.

(21) Appl. No.: 16/315,477

(22) PCT Filed: Jul. 7, 2017

(86) PCT No.: PCT/GB2017/052005
§ 371 (c)(1),
(2) Date: Jan. 4, 2019

(87) PCT Pub. No.: WO2018/007829
PCT Pub. Date: Jan. 11, 2018

(65) Prior Publication Data
US 2019/0298158 A1 Oct. 3, 2019

(30) Foreign Application Priority Data

Jul. 7, 2016 (GB) ..................... 1611819

(51) Int. Cl.
*A61B 1/01* (2006.01)
*A61B 5/00* (2006.01)
(Continued)

(52) U.S. Cl.
CPC .............. *A61B 1/01* (2013.01); *A61B 5/0059* (2013.01); *A61B 34/20* (2016.02); *A61B 90/39* (2016.02);
(Continued)

(58) Field of Classification Search
CPC .......... A61B 1/01; A61B 34/20; A61B 90/39; A61B 34/30; A61B 2034/2055;
(Continued)

(56) References Cited

U.S. PATENT DOCUMENTS 5,148,022 A 9/1992 Kawaguchi et al.
5,279,309 A * 1/1994 Taylor .................... A61B 34/76
600/595

(Continued)

FOREIGN PATENT DOCUMENTS

CN 1769838 A * 5/2006 ............... G06T 5/30
CN 101995240 A 3/2011
(Continued)

OTHER PUBLICATIONS

Plucinski, J., Wierzba, P., & Myllylae, R. A. (Aug. 2001). System for time-resolved spectroscopy using a semiconductor picosecond laser. In Optoelectronic and Electronic Sensors IV (vol. 4516, pp. 21-25). SPIE. (Year: 2001).*

(Continued)

*Primary Examiner* — Keith M Raymond
*Assistant Examiner* — Johnathan Maynard
(74) *Attorney, Agent, or Firm* — Alston & Bird LLP

(57) ABSTRACT

A method of determining a location of an optical fibre positioned at least partially inside a scattering medium, the method comprises transmitting pulsed light into the scattering medium, receiving, by a detector, photons of the pulsed light that have passed through the scattering medium, selecting signals corresponding to some of the received photons, wherein the selecting is based on a time of arrival of the received photons; and determining a location of the optical fibre based on the selected signals.

11 Claims, 4 Drawing Sheets

(51) Int. Cl.

| | | |
|---|---|---|
| A61B 34/20 | (2016.01) | |
| A61B 90/00 | (2016.01) | |
| G01J 1/44 | (2006.01) | |
| G01J 3/28 | (2006.01) | |
| G01K 11/32 | (2021.01) | |
| G01N 21/47 | (2006.01) | |
| G01N 21/64 | (2006.01) | |
| G01S 7/4865 | (2020.01) | |
| G04F 10/00 | (2006.01) | |
| G04F 13/02 | (2006.01) | |
| H04N 25/773 | (2023.01) | |
| H10F 30/225 | (2025.01) | |
| H10F 77/00 | (2025.01) | |

(52) U.S. Cl.
CPC ............ *G01J 3/2889* (2013.01); *G01K 11/32* (2013.01); *G01N 21/4795* (2013.01); *G01N 21/6408* (2013.01); *G01S 7/4865* (2013.01); *G04F 10/005* (2013.01); *G04F 13/026* (2013.01); *H04N 25/773* (2023.01); *H10F 30/225* (2025.01); *H10F 77/959* (2025.01); *A61B 2034/2055* (2016.02); *A61B 2090/3929* (2016.02); *A61B 2090/3937* (2016.02); *A61B 2090/3941* (2016.02); *A61B 2090/3945* (2016.02); *A61B 2090/3975* (2016.02); *A61B 2090/3979* (2016.02); *A61B 2562/0238* (2013.01); *G01J 2001/442* (2013.01); *G01N 2021/4797* (2013.01)

(58) Field of Classification Search
CPC .... A61B 2090/3929; A61B 2090/3937; A61B 2090/3941; A61B 2090/3945; A61B 2090/3975; A61B 2090/3979; A61B 2562/0238; A61B 5/0059; G01D 5/353; G01J 5/0821; G01J 3/2889; G01J 2001/442; G01K 11/32; G01N 21/4795; G01N 2021/4797; G01N 21/6408; G01S 5/14; G01S 11/12; G01S 7/4865; H10F 30/225; H10F 77/959; G04F 10/005; G04F 13/026; H04N 25/773

See application file for complete search history.

(56) References Cited

U.S. PATENT DOCUMENTS

| | | | |
|---|---|---|---|
| 5,625,458 A | 4/1997 | Alfano et al. | |
| 5,696,863 A * | 12/1997 | Kleinerman | G01D 5/35364 385/12 |
| 5,808,304 A | 9/1998 | Parent et al. | |
| 6,321,111 B1* | 11/2001 | Perelman | G01N 21/4795 250/358.1 |
| 7,329,857 B1* | 2/2008 | Weiss | G02B 6/001 385/12 |
| 2002/0099293 A1* | 7/2002 | Fontenot | A61B 1/3132 600/478 |
| 2005/0004453 A1* | 1/2005 | Tearney | A61B 5/416 356/450 |
| 2005/0018185 A1 | 1/2005 | Genet et al. | |
| 2005/0078924 A1 | 4/2005 | Viellerobe et al. | |
| 2005/0157981 A1 | 7/2005 | Berier et al. | |
| 2005/0207668 A1 | 9/2005 | Perchant et al. | |
| 2005/0242298 A1 | 11/2005 | Genet et al. | |
| 2006/0056017 A1 | 3/2006 | Berier et al. | |
| 2006/0058685 A1* | 3/2006 | Fomitchov | B82Y 10/00 600/476 |
| 2006/0187533 A1* | 8/2006 | Nielsen | G02F 1/39 359/333 |
| 2006/0241395 A1* | 10/2006 | Kruger | A61B 5/0059 600/424 |
| 2006/0256194 A1 | 11/2006 | Viellerobe et al. | |
| 2007/0177104 A1 | 8/2007 | Lacombe et al. | |
| 2007/0273930 A1 | 11/2007 | Berier et al. | |
| 2007/0290145 A1 | 12/2007 | Viellerobe et al. | |
| 2008/0029711 A1 | 2/2008 | Viellerobe et al. | |
| 2008/0045848 A1 | 2/2008 | Lacombe et al. | |
| 2008/0225231 A1 | 9/2008 | Lacombe et al. | |
| 2008/0231807 A1 | 9/2008 | Lacombe et al. | |
| 2009/0023999 A1 | 1/2009 | Mathieu et al. | |
| 2009/0041314 A1 | 2/2009 | Vercauteren et al. | |
| 2009/0097806 A1 | 4/2009 | Viellerobe et al. | |
| 2009/0240143 A1 | 9/2009 | Osdoit et al. | |
| 2010/0168610 A1 | 7/2010 | Lacombe et al. | |
| 2010/0234686 A1 | 9/2010 | Lacombe et al. | |
| 2010/0296178 A1 | 11/2010 | Genet et al. | |
| 2011/0015529 A1 | 1/2011 | Abrat et al. | |
| 2011/0133101 A1 | 6/2011 | Viellerobe et al. | |
| 2011/0254980 A1 | 10/2011 | Perchant et al. | |
| 2011/0274325 A1 | 11/2011 | Vercauteren et al. | |
| 2011/0279361 A1 | 11/2011 | Onishi | |
| 2011/0317963 A1 | 12/2011 | Rocher et al. | |
| 2012/0035484 A1 | 2/2012 | Thiberville et al. | |
| 2012/0123236 A1 | 5/2012 | Boularot et al. | |
| 2012/0184842 A1 | 7/2012 | Boularot et al. | |
| 2014/0117207 A1 | 5/2014 | Savoire et al. | |
| 2014/0207150 A1 | 7/2014 | Rosa et al. | |
| 2014/0299751 A1* | 10/2014 | Tang | B82Y 20/00 385/14 |
| 2015/0057499 A1 | 2/2015 | Erden et al. | |
| 2015/0104394 A1 | 4/2015 | Abbaci et al. | |
| 2016/0253801 A1 | 9/2016 | Linard et al. | |
| 2016/0256101 A1* | 9/2016 | Aharoni | A61B 5/0086 |
| 2017/0052065 A1* | 2/2017 | Sharma | G01S 17/894 |

FOREIGN PATENT DOCUMENTS

| | | | |
|---|---|---|---|
| FR | 2852394 | A1 | 9/2004 |
| FR | 2865369 | A1 | 7/2005 |
| JP | H02-290534 | A | 11/1990 |
| JP | H04-176427 | A | 6/1992 |
| JP | H06-098890 | A | 4/1994 |
| JP | 2001-292103 | A | 10/2001 |
| JP | 3460839 | B2 | 10/2003 |
| JP | 2006-521860 | A | 9/2006 |
| JP | 2006-523376 | A | 10/2006 |
| JP | 2011-237361 | A | 11/2011 |
| JP | 2015-125090 | A | 7/2015 |
| WO | WO 94/16623 | A1 | 8/1994 |
| WO | WO 2004/079444 | A2 | 9/2004 |
| WO | WO 2006/102259 | A2 | 9/2006 |
| WO | WO 2015/072964 | A1 | 5/2015 |

OTHER PUBLICATIONS

Michalet X, Siegmund OHW, Vallerga JV, Jelinsky P, Millaud JE, Weiss S. A space-and time-resolved single photon counting detector for fluorescence microscopy and spectroscopy. Proc SPIE Int Soc Opt Eng. 2006;6092:60920M. (Year: 2006).*

Leblond, F., Dehghani, H., Kepshire, D., & Pogue, B. W. (2009). Early-photon fluorescence tomography: spatial resolution improvements and noise stability considerations. JOSA A, 26(6), 1444-1457. (Year: 2009).*

Bérubé-Lauzière, Y., Crotti, M., Boucher, S., Ettehadi, S., Pichette, J., & Rech, I. (2016). Prospects on Time-Domain Diffuse Optical Tomography Based on Time-Correlated Single Photon Counting for Small Animal Imaging. Journal of Spectroscopy, 2016(1), 1947613. (Year: 2016).*

Plucinski, J. (2004, August). Time-of-flight spectroscopy for medical applications. In Optical Security and Safety (vol. 5566, pp. 132-139). SPIE. (Year: 2004).*

Plucinski, J., Wierzba, P., & Myllylae, R. A. (2001, August). System for time-resolved spectroscopy using a semiconductor picosecond laser. In Optoelectronic and Electronic Sensors IV (vol. 4516, pp. 21-25). SPIE. (Year: 2001).*

Andreoni, A., Nardo, L., Zambra, G., & Bondani, M. (2009). Time-correlated single-photon counting based method for submil-

(56) References Cited

OTHER PUBLICATIONS limeter transillumination imaging of objects embedded in tissue-phantoms. Journal of Modern Optics, 56(2-3), 413-421. (Year: 2009).*
Cova, S., Ghioni, M., Lacaita, A., Samori, C., & Zappa, F. (1996). Avalanche photodiodes and quenching circuits for single-photon detection. Applied optics, 35(12), 1956-1976. (Year: 1996).*
Becker, W. (Ed.). (2015). Advanced time-correlated single photon counting applications (vol. 111, p. 642). Cham: Springer International Publishing. (Year: 2015).*
International Searching Authority, International Search Report and Written Opinion for International Application No. PCT/GB2017/052005, Sep. 27, 2017, 12 pages, European Patent Office, Netherlands.
Japan Patent Office, Office Action received for Application No. 2019-500490, dated Jun. 29, 2021, 12 pages, Japan.
The State Intellectual Property Office of the People's Republic of China, Office Action received for Application No. 201780050294.0, dated Apr. 25, 2021, 22 pages, PRC.
Al Abbas, T., et al., "Backside illuminated SPAD image sensor with 7.83m pitch in 3D-stacked CMOS technology," Proceedings of the 2016 IEEE International Electron Devices Meeting, Dec. 3-6, 2016, 5 pages, San Francisco, CA.
Chandrasekharan, Harikumar K., et al., "Multiplexed single-mode wavelength-to-time mapping of multimode light," Nature Communications, Jan. 25, 2017, 10 pages, vol. 8, No. 14080, Nature Portfolio, Germany.
Chitnis, Danial, et al., "Functional imaging of the human brain using a modular, fibre-less, high-density diffuse optical tomography system," Biomedical Optics Express, Oct. 1, 2016, pp. 4275-4288, vol. 7, No. 10, Optical Society of America, US.
Choudhury, D., et al., "Endoscopic sensing of alveolar pH," Biomedical Optics Express, Jan. 1, 2017, pp. 243-259, vol. 8, No. 1, Optical Society of America, US.
Clavadetscher, Jessica, et al., "Anticancer Therapy: Hot Paper: In-Cell Dual Drug Synthesis by Cancer-Targeting Palladium Catalysts," Angewandte Chemie International Edition, May 9, 2017, pp. 6864-6868, vol. 46, Wiley-VCH Verlag GmbH & Co. KGaA, Germany.
Ehrlich, K., et al., "Fibre Optic Time-Resolved Spectroscopy using SMOS-SPAD Arrays", Proceedings of SPIE, Optical Fibers and Sensors for Medical Diagnostics and Treatment Applications XVII, Feb. 28, 2017, pp. 301-308, vol. 10058, SPIE, US.
Farsiu, Sina, et al., "Statistical detection and imaging of objects hidden in turbid media using ballistic photons," Applied Optics, Aug. 10, 2007, pp. 5805-5822, vol. 46, No. 34, Optical Society of America, US.
Gariepy, Genevieve, et al., "Article: Single-photon sensitive light-in-flight imaging," Nature Communications, Jan. 27, 2015, 7 pages, vol. 6, No. 6021, Macmillan Publishers Limited, UK.
Gopal, Venkatesh, et al., "Imaging in turbid media using quasi-ballistic photons," Optics Communications, Nov. 1, 1999, pp. 331-345, vol. 170, Elsevier Science, B.V., Netherlands.
Kufcsàk, A., et al., "Time-resolved spectroscopy at 19,000 lines per second using a Cmos Spad line array enable advanced biophotonics applications," Optics Express, May 15, 2017, pp. 11103-11123, vol. 25, No. 10, Optical Society of America, US.
Lally, Evan, et al., "Fiber optic shape sensing for monitoring of flexible structures," Proceedings of SPIE, Sensors and Smart Structures Technologies for Civil, Mechanical, and Aerospace Systems, Apr. 6, 2012, pp. 83452y-1 thru 83452Y-9, vol. 8345, SPIE, US.
Mukherjee, Sebabrata, et al., "Article: Experimental observation of anomalous topological edge modes in a slowly driven photonic lattice", Nature Communications, Jan. 4, 2017, 7 pages, vol. 8, No. 13918, Nature Portfolio, Germany.
Mukherjee, Sebabrata, et al., "Observation of a Localized Flat-Band State in Photonic Lieb Lattice," Physical Review Letters, Jun. 19, 2015, pp. 245504-1 thru 245504-5, No. 114, American Physical Society, US.
Natarajan, Chandra M., et al., "Topical Review: Superconducting nanowire single-photon detectors: physics and applications", Superconductor Science and Technology, Apr. 4, 2012, 16 pages, vol. 25, No. 063001, IOP Publishing Ltd., UK.
Northern Digital Inc., "Aurora", retrieved from the Internet Archive at <URL: https://web.archive.org/web/20160619111614/http://www.ndigital.com:80/medical/products/aurora/> on Jan. 31, 2023, 11 pages.
Proteus, "Proteus Overview 2015", published Dec. 17, 2015, 14 pages, The Queens Medical Research Institute and The University of Edinburgh, UK.
Satat, Guy, et al., "All Photons Imaging Through Volumetric Scattering," Scientific Reports, Sep. 29, 2016, 8 pages, vol. 6, No. 33946, Nature Publishing Group, UK.
Schicho, Kurt, et al., "Stability of miniature electromagnetic tracking systems," Physics in Medicine and Biology, Jun. 2005, pp. 2089-2098, vol. 50, Institute of Physics Publishing, UK.
Silverstone, J. W., et al., "Letters: On-chip quantum interference between silicon photon-pair sources," Nature Photonics, Feb. 2014, pp. 104-108, vol. 8, Macmillan Publishers Limited, UK.
Tanner, M. G., et al., "Enhanced telecom wavelength single-photon detection with NbTiN superconducting nanowires on oxidized silicon", Applied Physics Letters, Jun. 3, 2010, pp. 221109-1 thru 221109-3, vol. 96, American Institute of Physics, US.
Tanner, M. G., et al., "Ballistic and snake photon imaging for locating optical endomicroscopy fibres," Biomedical Optics Express, Sep. 1, 2017, pp. 4077-4095, vol. 8, No. 9, retrieved from the Internet at <URL: https://arxiv.org/ftp/arxiv/papers/1703/1703.05572.pdf>.
Tanner, Michael G., et al., "High-resolution single-mode fiber-optic distribution Raman sensor for absolute temperature measurement using superconducting nanowire single-photon detectors," Applied Physics Letters, Nov. 17, 2011, pp. 201110-1 thru 201110-3, vol. 99, American Institute of Physics, US.
Weiss, Jason T., "Article: Extracellular palladium-catalysed dealkylation of 5-fluoro-1-propargyl-uracil as a bioorthogonally activated prodrug approach," Nature Communications, Feb. 13, 2014, 9 pages, Macmillan Publishers Limited, UK.
Yoo, K. M., et al., "Time-resolved coherent and incoherent components of forward light scattering in random media," Optics Letters, Mar. 15, 1990, pp. 320-322, vol. 15, No. 6, Optical Society of America, US.
Yusop, Rahimi M., et al., "Articles: Palladium-mediated intracellular chemistry", Nature Chemistry, Mar. 2011, pp. 239-243, vol. 3, Macmillan Publishers Limited, UK.
European Patent Office, Communication pursuant to Article 94(3) EPC received for Application No. 17740465.4, dated Apr. 18, 2024, 5 pages, Germany.
Ripamonti, G., et al., "No Dead-Space Optical Time-Domain Reflectometer", Journal of Lightwave Technology, Sep. 1990, pp. 1278-1283, vol. 8, No. 9, IEEE, USA.
China National Intellectual Property Administration, Reexamination Decision received for Application No. 201780050294.0, dated Jun. 27, 2025, 44 pages, People's Republic of China.

* cited by examiner

IMAGING METHOD AND APPARATUS

CROSS REFERENCE TO RELATED APPLICATIONS

This application is a National Stage Application, filed under 35 U.S.C. § 371, of International Application No. PCT/GB2017/052005, filed Jul. 7, 2017, which claims priority to United Kingdom Application No. 1611819.2, filed Jul. 7, 2016; the contents of both of which as are hereby incorporated by reference in their entirety.

BACKGROUND

Related Field

The present invention relates to a method and apparatus for determining a location of an optical fibre that is positioned inside a scattering medium, for example inside human or animal tissue.

DESCRIPTION OF RELATED ART

Optical fibre based endoscopes are increasingly used for imaging and sensing internal to the human body. While bulk endoscopes often can be guided to particular regions of the internal organs through a steering mechanism, narrow optical fibre endoscopes may extend beyond the reach of the conventional system, having been pushed out of the working channel of the bulk endoscope. Alternatively, narrow fibre based endoscopes may be inserted without the use of any guided bulk endoscope at all.

In some scenarios, the final location of the tip of the endoscope may be approximated from knowledge of the insertion of the bulk endoscope, manual feel by the clinician, and/or visible structures in the very limited (for example, less than 1 mm) field of view of a fibre-based endoscope imaging system. In some circumstances, stereotactic techniques may be used to estimate the location of a fibre endoscope tip.

X-ray or electromagnetic technologies may be used to view a metal end tip that may be on the end of the endoscope. However, X-ray or electromagnetic technologies may be expensive and/or require bulky apparatus. Furthermore, using X-rays to determine the location of the tip of the endoscope may expose a patient to unwanted radiation.

BRIEF SUMMARY

In a first aspect of the invention, there is provided a method of determining a location of an optical fibre positioned at least partially inside a scattering medium, the method comprising: transmitting pulsed light into the scattering medium; receiving, by a detector, photons of the pulsed light that have passed through the scattering medium; selecting signals corresponding to some of the received photons, wherein the selecting is based on a time of arrival of the received photons; and determining a location of the optical fibre based on the selected signals.

By selecting signals based on a time of arrival, signals may be selected that are representative of photons that have undergone no scattering or a very small amount of scattering. Such signals may provide better location of the optical fibre than signals that are not selected based on time of arrival.

The scattering medium may comprise human or animal tissue or fluids.

Determining a location of the optical fibre by providing pulsed light through the fibre may allow location of the optical fibre to be determined without using other methods that may expose a patient or other subject to unwanted radiation.

The determining of the location of the optical fibre based on the selected signals may comprise forming an image using the selected signals, and determining the location of the optical fibre based on the image.

The location may be determined automatically. The location may be determined manually. The location may be determined by processing the image using image processing techniques. The location may be determined by finding a part of the image having high intensity, for example a pixel of the image having a maximum intensity.

The selecting may comprise selecting signals corresponding to ballistic photons. Ballistic photons may comprise photons that have undergone no scattering in the scattering medium and/or photons that have undergone a very small number of scattering events. Ballistic photons may comprise the first photons of the pulsed light to be received at the detector. Ballistic photons may comprise photons that are received within a first time bin.

The selecting may comprise selecting signals corresponding to snake photons. Snake photons may comprise photons that are later to arrive than ballistic photons, but that retain some location information.

The transmitting of pulsed light into the scattering medium may be via the optical fibre. The detector may be positioned outside the scattering medium.

The optical fibre may be configured to transmit the pulsed light into the scattering medium from a distal tip of the optical fibre. If the pulsed light is transmitted only from the tip, the light from the tip may be considered to be a point source. The determining of the location may be based on considering the light from the tip to be emitted from a point source.

The optical fibre may be configured to transmit the pulsed light into the scattering medium through at least part of a side of the optical fibre. By transmitting pulsed light from the side of the optical fibre, a location of an extended section of the optical fibre may be determined, instead of just determining a single point at the tip. An expected shape of the optical fibre may be used in determining the location of the optical fibre.

The transmitting of pulsed light into the scattering medium may be from a light source positioned outside of the scattering medium. The detector may be coupled to the optical fibre. The receiving of the photons may comprise receiving photons that have passed into the optical fibre.

The transmitting of the pulsed light into the scattering medium may comprise varying a position of the light source with respect to the scattering medium and/or varying an incident position of the pulsed light from the light source on the scattering medium. The position of the detector and/or the incident position of the light may be varied to build up an image by scanning the light across the scanning medium, for example across a patient.

The optical fibre may be configured such that photons pass into a distal tip of the optical fibre. The optical fibre may be configured such that photons pass into at least part of a side of the optical fibre.

The determining of the location of the optical fibre may comprise applying shape-based image processing techniques to the image to determine a location of the at least part of the side of the optical fibre.

The selecting of the signals may comprise selecting signals having a time of arrival below a threshold value. The selecting of the signals may comprise selecting signals having a time of arrival within a time interval. The selecting of the signals may comprise selecting signals within one or more time bins.

The pulsed light may comprise narrow band laser light. The pulsed light may comprise short pulse laser light. The pulsed light may comprise pulses having a length of less than 1000 ps, optionally less than 500 ps.

The method may further comprise filtering the received photons using a filter. The filter may be configured to transmit photons at a wavelength of the pulsed light.

The method may further comprise illuminating, with light having a wavelength spectrum that does not include a wavelength of the pulsed light, an environment in which the scattering medium is placed. By illuminating the environment with light that does not include the wavelength of the pulsed light, noise may be reduced. The method of locating the optical fibre may be used in an illuminated environment (for example, an operating theatre). Illuminating the environment with light that does not include the wavelength of the pulsed light may allow the method of location to be used during procedures such as surgery in which strong lighting may be used.

The detector may comprise a detector array. The detector may comprise a scanning detector. The detector may comprise a single-photon detector. The single-photon detector may comprise at least one SPAD (single photon avalanche diode). The detector may comprise at least one of: an APD (avalanche photo diode detector), a streak camera, a time-gated intensified camera with a CCD detector array (ICCD), a photomultiplier tube (PMTs), a superconducting single photon detector.

The method may further comprise focusing the received photons onto the detector using at least one focusing component. The at least one focusing component may comprise at least one lens.

The optical fibre may be part of at least one medical instrument. The optical fibre may be co-located with at least one medical instrument The medical instrument may comprise at least one of an endoscope, a guide wire, a catheter, a catheter delivery system, a scalpel, an energy source for ablation or modification of tissue.

The method may further comprise determining a location of at least part of the medical instrument based on the determined location of the at least part of the optical fibre.

The medical instrument may be positioned at least partially inside a human or animal body. The determining of the location of the medical instrument may comprise determining a location of the medical instrument inside the human or animal body.

The medical instrument may be placed inside the human or animal body using an automated procedure. The determining of the location of the medical instrument may comprise a verification of the automated procedure.

The scattering medium may comprise tissue of at least one of: a lung, an upper gastrointestinal tract, a lower gastrointestinal tract, a urinary tract, bone tissue, organ tissue.

The method may further comprise using the selected photons to determine a tissue type of at least part of the human or animal tissue.

The determining of the tissue type of the at least part of the human or animal tissue may comprise determining whether the tissue is healthy or diseased.

The determining of the tissue type may comprise determining a degree of scattering of the photons corresponding to the selected signals, and determining the tissue type based on the determined degree of scattering.

In a further aspect of the invention, which may be provided independently, there is provided an apparatus comprising: an optical fibre configured to be positioned at least partially inside a scattering medium; a pulsed light source configured to transmit pulsed light into the scattering medium; a detector configured to receive photons of the pulsed light that have passed through the scattering medium; and a processor configured to select signals corresponding to some of the received photons based on a time of arrival of the received photons, and to determine a location of the optical fibre based on the selected signals.

In another aspect of the invention, which may be provided independently, there is provided a computer program product comprising computer-readable instructions that are executable by a processor to select signals corresponding to received photons of pulsed light that have passed through a scattering medium based on a time of arrival of the received photons, and to determine a location of an optical fibre based on the selected signals.

There may be provided a method or system substantially as described herein with reference to the accompanying drawings.

Features in one aspect may be provided as features in any other aspect as appropriate. For example, features of a method may be provided as features of an apparatus and vice versa. Any feature or features in one aspect may be provided in combination with any suitable feature or features in any other aspect.

BRIEF DESCRIPTION OF THE FIGURES

Embodiments of the invention are now described, by way of non-limiting example, and are illustrated in the following figures, in which:—

DETAILED DESCRIPTION OF VARIOUS EMBODIMENTS

It can be commonly observed that, in some circumstances, light may pass through tissue. For example, a bright white torch held against a hand or fingers may be observed as a red glow on an opposite surface of the hand or fingers. Embodiments of the present invention use light passing through tissue (or through any other suitable scattering medium) to determine a location of an optical fibre that is positioned inside that tissue (or other scattering medium).

Figure 1:
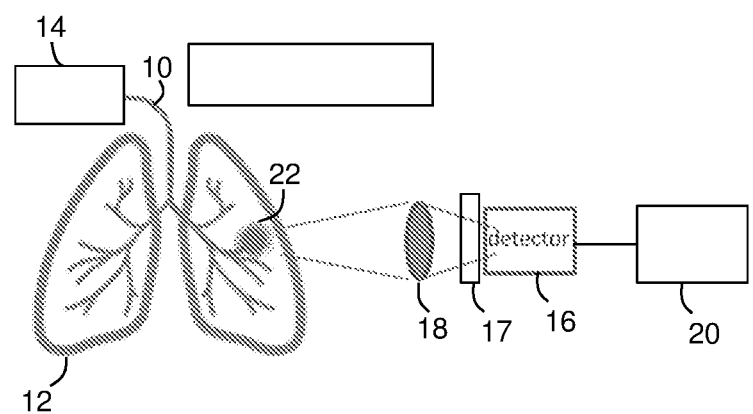
FIG. 1 is a schematic illustration of a fibre and detector setup in accordance with an embodiment.

An apparatus in accordance with an embodiment is illustrated schematically in FIG. 1. The apparatus comprises an optical fibre 10, light source 14, detector 16, filter 17, lens 18 and processor 20.

In the embodiment of FIG. 1, the optical fibre 10 is part of a fibre endoscope. In other embodiments, any suitable optical fibre(s) may be used. FIG. 1 shows the optical fibre 10 positioned inside the lungs 12 of a patient. In other embodiments, the optical fibre 10 may be positioned inside a different part of a human or animal body, for example the gastrointestinal tract or urinary tract. In further embodiments, the optical fibre 10 may be positioned inside any suitable scattering medium. The scattering medium may be, for example, tissue, a body, or an organ. The scattering medium may be a gas. The scattering medium may be a liquid, for example a murky liquid. The scattering medium may be a fog. The scattering medium may be referred to as a sample, with at least the tip of the optical fibre being positioned inside the sample.

The light source 14 is coupled to the proximal end of the optical fibre 10 and is configured to deliver pulsed light into the optical fibre 10. In the present embodiment, the light source 14 is a narrow band short pulse laser.

The detector 16 (which may be referred to as a camera) is positioned outside the body of the patient. The detector 16 is configured to receive photons and generate an electrical signal corresponding to each received photon. In the present embodiment, the detector 16 is a detector array comprising a plurality of detector elements. The detector 16 is a time-resolved single photon imaging system. In this case, the time-resolved single photon imaging system comprises a 32×32 array of SPADs (single photon avalanche diodes). The time-resolved single photon imaging system operates by time-correlated single-photon counting (TCSPC). In other embodiments, any suitable time-resolved detector may be used. The time-resolved detector may be a time-resolved detector that is capable of detecting low levels of light, for example capable of detecting single photons. The time-resolved detector may comprise an APD (avalanche photo diode) detector or a streak camera. The time-resolved detector may comprise a time-gated intensified camera with a CCD detector array (ICCD). The time-resolved detector may comprise a plurality of photomultiplier tubes (PMTs) or superconducting single photon detectors. In some embodiments, multiple detectors 16 may be used. In some embodiments, a single element detector may be used in combination with an optical scanning system to create an image.

In the present embodiment, the detector 16 is mounted on an arm (not shown) which may be placed at any suitable position relative to the body of the patient. In other embodiments, any suitable mounting of the detector 16 may be used. For example, the detector 16 may be mounted on the ceiling of a room in which a procedure is to be performed in which the optical fibre 10 is to be positioned inside the patient, for example the ceiling of a hospital ward or operating theatre. In some embodiments, the detector 16 may be mounted on the head or body of the clinician, assistant or other user, to provide intuitive feedback to the clinician, assistant or other user.

Lens 18 is positioned between the detector 16 and the patient's body. The detector 16 and the lens 18 are arranged such that the detector 16 is in focus on the body of the patient. In other embodiments, an alternative focusing component may be used instead of the lens 18, or no focusing component may be used.

Filter 17 is positioned in front of the detector 16. In the present embodiment, filter 17 is positioned between the detector 16 and the lens 18. In the present embodiment, filter 17 is a narrow line pass filter. Filter 17 is configured to block any photons that are not within the spectral band of the laser source 14. In other embodiments, an alternative filter may be used, or no filter may be used.

The detector 16 is connected to a processor 20 which is configured to receive and analyse signals from the detector 16. The processor 20 may comprise any suitable processing device, for example a computing device such as a desktop PC, laptop or mobile device. Although in the present embodiment the detector 16 and processor 20 are separate components, in other embodiments the functions of the detector 16 and processor 20 may be combined in a single component. Functions described as being performed by the detector 16 may be performed by the processor 20, and vice versa.

A principle of operation of the apparatus illustrated in FIG. 1 is now described. Optical fibre 10 is introduced into the lungs 12 of the patient. In the present embodiment, optical fibre 10 is part of a fibre endoscope and is introduced into the lungs 12 of the patient as part of an endoscopy procedure.

Short pulsed (in the present embodiment, having a pulse length of <500 ps) narrow band laser light is injected into the optical fibre 10 by light source 14. In some circumstances, use of a short pulsed source may be important for operation. In some circumstances, any pulsed light with a repeatable leading edge may be used.

In the present embodiment, the illumination power of the laser source 14 is a few mW. It is known that mW illumination powers are safe in tissue. In other embodiments, a different illumination power may be used. In the present embodiment, the pulse rate is 20 MHz. The laser light is injected into the optical fibre 10 over a time period that may be seconds or minutes.

Careful choice of wavelength for the laser source 14 may provide superior performance. The wavelength of the laser source 14 may be chosen to be a wavelength that has low scattering and absorption in tissue.

In some embodiments in which the optical fibre 10 is part of an endoscope, the native illumination of an imaging system of the endoscope may be used as the light source. In such embodiments, light source 14 may be the same light source that is used by the imaging system of the endoscope to illuminate a region of the lung 12 in order to obtain an image of that region of the lung 12.

In some embodiments, optical fibre 10 is an optical fibre that is also used for imaging by the endoscope. In some such embodiments, light source 14 is different from the light source that is used by the endoscope for imaging, so the same optical fibre 14 is used with two different light sources (light source 14 and an imaging light source) to perform two different functions (optical fibre location and imaging of a region of the lung respectively).

As described above, the pulse rate of the laser light in this embodiment is 20 MHz and the laser light is injected for seconds or minutes. Thousands of pulses are therefore used. Each pulse may have a pulse length of less than 500 ps. We consider the progress of one of those pulses.

The pulse of laser light is emitted from the light source 14 and passes down the length of the optical fibre 10. The optical fibre 10 emits the pulse of laser light from its distal tip as a large number of photons (shown as light 22 in FIG. 1). The time of emission of the pulse of light from the distal tip of the optical fibre 10 may be designated as t=0.

In the present embodiment, the photons are emitted directly from the end of the optical fibre. The end of the optical fibre may be considered as a point source of light. In other embodiments (see below), photons may also be emitted from the sides of the optical fibre.

In the present embodiment, the emission of the photons from the end of the optical fibre is directional, having a preferred direction that is a continuation of the longitudinal axis of a distal portion of the optical fibre. In other embodiments, the tip of the fibre may be adapted to produce a more omnidirectional emission of light, for example by adding a structure that is highly scattering to the distal end of the optical fibre. Adding such a highly scattering structure may in some circumstances increase the amount of light that is emitted in a direction towards the detector 16, and may therefore increase the amount of photons that are detected by the detector 16.

As may be seen when placing a bright white light torch next to the hand or fingers, attenuation of an optical signal through tissue may be severe, but may be less at red wavelengths than at lower wavelengths (hence white light appears reddened after passing through tissue).

In the present embodiment, only a small number of the photons emitted from the distal tip of the optical fibre 10 may escape from the body. Many of the photons emitted by the optical fibre 10 are absorbed in the tissue. Most of the photons that escape from the body (and therefore can be observed by the detector 16) may have undergone much scattering from the disordered tissue structures of the body. The time taken by each photon to travel through the tissue may be dependent on how many times the photon has been scattered while travelling through the tissue.

Some of the photons emitted by the optical fibre 10 pass through the tissue and out of the body. The photons that pass through the tissue and out of the body may comprise ballistic photons, snake photons, and/or highly scattered photons.

Ballistic photons may be photons that travel through a scattering medium in a straight line substantially without scattering. Such photons may be considered not to have collided with the atoms of the scattering medium. Ballistic photons may be substantially coherent. Some of the photons emitted from the end of the optical fibre 10 may be considered to be ballistic photons, and to pass through the tissue substantially without scattering.

In the present embodiment, photons that are referred to as ballistic have been scattered at least once very close to the tip of the fibre. The geometry of the system may result in true ballistic photons (photons that have not been scattered at all) not being received by the detector 16. In other arrangements, the photons that are considered to be ballistic may include true ballistic photons.

In many embodiments, it is unlikely that the time resolution of the system such as to be able to distinguish between true ballistic photons and those photons that have been scattered a very few times. True ballistic photons and photons that have undergone a very small number of scattering events may be grouped together as ballistic photons.

Experimentally the photons referred to as ballistic may be those observed to arrive before other photons. In the present embodiment, there is no absolute timing calibration. The arrival time of the ballistic photons is post defined by the observation of their arrival.

Ballistic photons may transit rapidly through the tissue and arrive at the detector 16 at time t=X, where X may be determined using the speed of light (through the medium) and the distance of the detector 16 from the fibre tip. The number of ballistic photons received by the detector 16 may reduce exponentially with the thickness of the scattering medium between the tip of the optical fibre 10 and the detector 16.

Slightly scattered photons may be referred to as snake photons. Snake photons may be those that have undergone a small number of scattering events in the tissue (more than those designated as ballistic), but which still may provide useful location information. Snake photons may retain some degree of coherence. Snake photons may arrive slightly delayed from the ballistic photons, at t=X+$\Delta$X1. Snake photons may transit rapidly through the tissue, but not quite as rapidly as the ballistic photons. In the present embodiment, photons for which $\Delta$X1 is less than 1 ns may be considered to be snake photons. In other embodiments, a different time range may be used to determine which photons are snake photons.

In practice, there may be considered to be a continuous scale from photons that undergo no scattering events to those that experience a very high number of scattering events. The term snake photons may be used generally to refer to photons that are not referred to as ballistic photons but that still may be considered to impart relevant location information.

Photons which experience a greater degree of scattering may be referred to as highly scattered photons, very scattered photons or randomly scattered photons. Highly scattered photons may arrive after the snake photons, at t=X+$\Delta$X2. Highly scattered photons may have been scattered extensively within the tissue. In the present embodiment, photons for which $\Delta$X2 is greater than 1 ns are considered to be highly scattered photons. In the present embodiment, highly scattered photons may be photons that impart spatial information with worse than 2 cm resolution. In other embodiments, different times may be used to distinguish ballistic photons, snake photons and highly scattered photons. The times $\Delta$X1, $\Delta$X2 may be highly dependent on experiment.

In some embodiments, a determination of which photons are considered to be ballistic photons, which are considered to be snake photons, and which are considered to be highly scattered photons may be performed after all the photons are received. $\Delta$X1, $\Delta$X2 may be post-defined after receiving photon data.

The photons that pass out of the body may comprise ballistic photons, snake photons, and highly scattered photons. Some of the photons passing out of the body travel in the direction of the detector 16 and are focused by lens 18 onto the detector 16. Any photons that are not within the spectral band of the laser source 14 may be blocked by the narrow line pass filter 17 in front of the detector 16. The narrow band line pass filter 17 may reduce noise (for example, unwanted photons from sources other than the optical fibre 10). Ballistic photons arrive first, followed by snake photons, followed by highly scattered photons.

In practice, the number of photons from each pulse that arrive at the detector 16 may be very small. In particular, only a small number of ballistic and/or snake photons may be obtained from each pulse. For some of the pulses, the number of photons from that pulse arriving at the detector 16 may be zero. Therefore, photons from a large number of pulses are collected by detector 16 and the results are summed as described below.

The detector 16 converts each detected photon into an electrical signal. In the present embodiment, the detector 16 operates by time-correlated single-photon counting (TCSPC) in start-stop mode. There is synchronisation between the light source 14 and the detector 16 via an electrical connection. When the laser light source 14 creates a pulse of light, it also sends an electrical pulse to the detector 16. When the detector 16 receives the electrical pulse it starts timing. When the detector 16 observes a photon (for example, when a detector element of the detector array observes a photon) the detector stops timing. The electrical signal representing the detected photon includes a time of arrival that represents the difference between the time of transmission of the pulse and the time at which the photon arrives at the detector 16.

In other embodiments, the detector 16 starts timing when it detects a photon, and stops timing when it receives the next electrical pulse (reverse start-stop mode). Since the time between pulses is known, a time of arrival may be determined. In other embodiments, any suitable method of determining a time of arrival may be used.

In the present embodiment, the electrical signal representing the detected photon also includes a position. The position is determined based on which array element(s) of the 32×32 array detected the photon.

In other embodiments, any suitable method of determining the time of arrival and/or position of each detected photon may be used. The time of arrival and/or position of each photon may be represented by any suitable signal or combination of signals.

The electrical signals are passed to the processor 20. The processor 20 collects the electrical signals across numerous pulses. The processor 20 combines the electrical signals by histogramming. In other embodiments, the processor 20 may combine the electrical signals in any suitable manner. In further embodiments, electrical signals may be combined in circuitry of the detector 16.

Since the time of arrival of each photon is determined relative to a time of transmission of its respective pulse, results can be combined across numerous pulses. For example, all ballistic pulses may be recorded with time t=X, regardless of which pulse they come from. In the present embodiment, the pulse rate is 20 MHz and results are obtained over a number of seconds. In other embodiments, results may be obtained over any suitable time period, for example less than a second, several seconds, or up to a minute. Any suitable pulse rate may be used.

The processor 20 records photon arrivals in time bins, which in this embodiment are 50 ps time bins. In other embodiments, any suitable size of time bins may be used.

An image of any of the 50 ps intervals may be produced. Recording photon arrivals in 50 ps time bins may allow a video to be produced of the photons arriving, with each 50 ps time bin corresponding to a frame of that video.

The processor 20 selects the electrical signals for which the determined time of arrival is within a desired time bin, for example within the first 50 ps time bin.

In some embodiments, a time gate is applied by the processor 20 and the processor 20 selects electrical signals for which the determined time of arrival is before within the time gate. In other embodiments, a time gate is applied by the detector 16 and the detector 16 passes to the processor 20 only those electrical signals for which the determined time of arrival is within the time gate.

In some embodiments, the time gate comprises an upper time threshold, and the signals selected are signals for which the time of arrival is below the upper time threshold. In other embodiments, the time gate comprises both upper and lower time thresholds, and the signals selected are signals for which the time of arrival is above the lower time threshold and below the upper time threshold.

In the present embodiment, the signals are sorted into bins in dependence on time of arrival, and the processor 20 or detector 16 selects electrical signals having a time of arrival that falls within a given bin or bins.

The processor 20 forms an image from the selected signals, which in this embodiment are the signals falling within the selected time bin. In the present embodiment, the image comprises one pixel for each element of the detector array 16. The detector array 16 comprises 32×32 elements, so the image formed is a 32×32 pixel image. The intensity of each pixel in the image represents the number of photons having a time of arrival within the selected time bin that was received by the corresponding array element during that time bin. Each of the detector elements of the detector array may detect light having a different angular origin relative to the detector array.

Figures 2A, 2B, 2C:
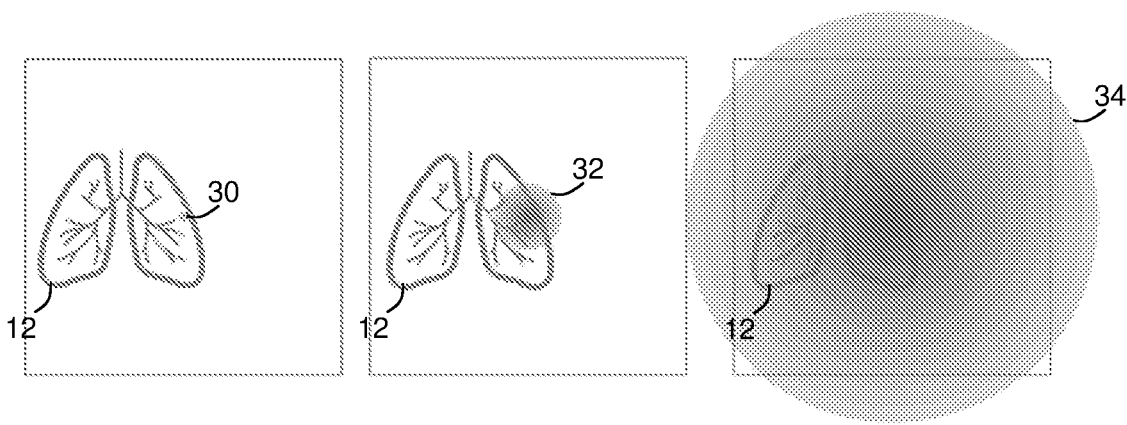
FIG. 2a is a schematic illustration representing an observed image using ballistic photon arrival.
FIG. 2b is a schematic illustration representing an observed image using snake photon arrival.
FIG. 2c is a schematic illustration representing an observed image using scattered photon arrival.

FIGS. 2a to 2c are schematic illustrations showing the sort of images that may be expected to be observed at different time bins, representative of photon arrival times. The images are overlaid on a representation of the lungs 12. FIGS. 2a to 2c do not show the effect of pixels on the image. FIGS. 2a to 2c represent the light that is emitted by the tip of the optical fibre 10 and passes through the body as circular regions 30, 32, 34 of increasing size. It may be noted that in real images of the human torso, the regions of light obtained are not expected to be circular, since the tissue of the human torso is not homogeneous and contains some types of tissue (for example, bone) that may absorb and/or scatter light to a different extent than other types of tissue.

FIG. 2a shows a representation of an observed image of ballistic arrival in a first time bin (for example, a 50 ps time bin) at t=X. The photons received in the first time bin may be considered to be ballistic photons, i.e. photons that are not scattered in the tissue or undergo only very few scatterings. The ballistic photons form a distribution 30 in the image that may be considered to represent a point source.

FIG. 2b shows a representation of an observed image of photons in a time bin (for example, a 50 ps time bin) at t=X+ΔX1. For example ΔX1 may be 2 ns. t=X+ΔX1 is a time at which slightly scattered snake photons arrive. The slightly scattered snake photons form a distribution 32 in the image that is larger than the point source 30 of FIG. 2a.

FIG. 2c shows a representation of an observed image of photons in a time bin (for example, a 50 ps time bin) at t=X+ΔX2. For example ΔX2 may be 5 ns. t=X+ΔX2 is a time at which very scattered photons arrive. The scattered photons form a distribution in the image that is larger again than the distribution 34 of FIG. 2c.

In a further embodiment, times ΔX1 and ΔX2 are 0.5 ns and 1.0 ns. In other embodiments, any suitable times may be used. In some embodiments, an image is plotted for each time bin in which photos are received.

In summary, the image obtained of the ballistic photons (FIG. 2a) shows a point source 30 at the end of the optic fibre. Snake photons (FIG. 2b) appear as a later arriving cloud 32 around the position of the point source 30. Further scattered photons (FIG. 2c) appear as an even more diffuse cloud 34 around the position of the point source 30.

In the present embodiment, the processor 20 forms two images. For the first image, a time bin is used to select signals that are representative of ballistic photons. The first image may look like an image of a point source.

Although, strictly speaking, ballistic photons are photons that have no scattering at all, in the present embodiment the category of ballistic photons may include photons that have a very small amount of scattering. For example, in the case where the tip of the optical fibre 10 does not point towards the detector 16, photons that are categorised as ballistic may have had to undergo at least one scattering in order to reach the detector. Such very-low-scattering photons may also be referred to as ballistic photons.

The processor 20 forms a second image in which a further time bin is used to select signals representative of snake photons.

In other embodiments, only one image is formed by the processor 20. The image may be an image using ballistic photons only, an image using both ballistic and snake photons, or an image using only snake photons.

In further embodiments, data may be collected at all arrival times. Images may be formed at a chosen arrival time. A width of a time gate, or limits of a time gate, may be chosen as desired to select combinations of ballistic and/or snake photons. The combinations of ballistic and/or snake photons may be such as to maximise determination of fibre tip location. In some embodiments, an image may be formed from one or more selected time bins. In some embodiments, an image may be formed using all photons received before a given arrival time, or between two arrival times.

The processor 20 determines a location of the tip of the optical fibre 10 by processing the first image and/or the second image. Since the optical fibre 10 is part of an endoscope, the location of the tip of the optical fibre 10 may be considered to be representative of the location of the distal end of the endoscope. Therefore, the processor 20 may determine a location for the distal end of the endoscope.

In the present embodiment, the processor 20 determines the location of the tip of the optical fibre 10 automatically using the intensities of the pixels of each image, which are representative of the numbers of photons received by each element of the detector array. It is expected that the intensity of a pixel representative of the location of the tip will be higher than the intensity of surrounding pixels. In other embodiments, any suitable method of determining the location of the tip may be used. In some embodiments, the location is determined from the electrical signals without forming an image.

In some embodiments, an image is displayed to a user and the user determines the position of the tip of the optical fibre from the image. In other embodiments, any automatic or semi-automatic method of determining the location may be used.

A position of the tip of the optical fibre 10 may be presented on an image of the tissue region into which the optical fibre is inserted. For example, an image obtained from an X-ray or CT scan may be displayed, and the determined position of the tip of the optical fibre may be overlaid on the X-ray or CT scan image. In other embodiments, other types of medical image may be used, for example images obtained from other modalities.

In the present embodiment, the optical fibre 10 is part of a fibre endoscope. By determining the location of the tip of the optical fibre 10, a location of the fibre endoscope is determined. A determined endoscope location, or images aiding endoscope location determination by the user obtained from the system, may be overlaid with pre-existing imagery of the scattering medium, which in this case is the tissue. The pre-existing imagery may comprise, for instance, X-rays or other medical scans. This may enable the user to confirm endoscope location in desired tissue locations. Alignment of images may be performed with markers on the body or other methods.

The location determined from the ballistic photon or snake photon image is a location in a plane defined by the orientation of the detector array 16, which may be designated as the xy plane. In some embodiments, a location of the optical fibre 10 in z is also determined by using time of flight of photons received by the detector 16 (for example, the time of flight of the ballistic photons) to determine a distance between the detector 16 and the tip of the optical fibre 10.

In some embodiments, the location of the tip of the optical fibre 10 is determined repeatedly over time. In some such embodiments, an image of the tissue region into which the optical fibre 10 is inserted may be overlaid with an indicator of the position of the tip of the optical fibre 10. The indicator of the position may move with time.

In some embodiments, a point location of the tip of the optical fibre 10 is determined, and is shown as a point on the image of the tissue region. In some embodiments, a ballistic or snake photon image may be overlaid on an image of the tissue region. In some such embodiments, no single point location may be determined.

In some embodiments, more than one detector 16 is used. For example, detectors 16 may be placed at different angles with respect to the body in which the optical fibre 10 is positioned. In some such embodiments, the results from the different detectors 16 may be used to determine a location for the optical fibre tip in three dimensions.

In some embodiments, a detector 16 is moved to different positions with respect to the body. For example, the detector 16 may be mounted to an arm, and the arm may be moved to different positions. The different positions of the detector 16 may be used to provide an improved location of the optical fibre tip. The different positions 16 may be used to obtain a view that avoids particular scatterers such as bone.

In the present embodiment, an aim is to detect the location of the end of the optical fibre, although in further embodiments (described below), more of the optical fibre may be imaged. A ballistic photon image such as that represented in FIG. 2*a* may give an accurate point source location for the tip of the optical fibre. For example, the tip of the optical fibre may be determined with centimetre accuracy.

Ballistic photons may be used to form an image of the point source (the end of the optical fibre) despite the scattering medium in between the point source and the detector. The low number of ballistic photons due to exponential loss with distance may in some circumstances make imaging of complex structures difficult. However, in the present embodiment, the tip of the optical fibre may be considered to be a simple point source that is brightly illuminated.

An image including snake photons (for example, similar to the image of FIG. 2*b*) may be used in the obtaining of the location of the tip of the optical fibre. The snake photons, although more spread out than the ballistic photons, may still impart useful spatial information about the fibre tip location. In some embodiments, the snake photons are used in combination with ballistic photons to improve signal strength. There may be many more snake photons than ballistic photons.

In some embodiments, signals corresponding to snake photons are used to obtain information about a scattering profile of the scattering medium (which in this case is tissue). Different tissue types may have different scattering profiles. For example, healthy lung tissue may have a different scattering profile from diseased lung tissue. A degree of scattering of the snake photons may be used to determine a tissue phenotype. For example, the degree of scattering may be used to determine whether the tissue is healthy or diseased. If a location of the fibre tip is known, information about whether the tissue is healthy or diseased can be associated with a particular location in the body. For example, in one embodiment the fibre tip is located in an image using ballistic photons, and an associated tissue type is determined from a corresponding image using snake photons.

Highly scattered photons may lose all spatial information. Using snake photons, tissue may be imaged using scattered photons that retain some spatial information. Highly scattered photons may have passed through too broad a region of tissue to provide information about the tissue the endoscope was in, whereas snake photons may have come more directly from that tissue.

In the present embodiment, highly scattered photons are ignored. Highly scattered photons may be time gated out of the image. In some circumstances, highly scattered photons may have little useful spatial information. Any spatial information that they do have may be decreasingly useful at higher values of $\Delta X2$.

The method of the present embodiment may provide a method of optically observing the location of an optical fibre (and therefore the location of a fibre endoscope) through imaging the small number of photons escaping through the tissue. Time-resolved detection of the photons is used to separate ballistic photons from the later arrival of the scattered photons. Successful imaging of the fibre tip location may be achieved through highly accurate time resolved measurement or gating of the detector 16 to discard the later arriving photons which would dominate imaging in a non-time resolved measurement. The ability of the ballistic photons to form an image may in some cases be key to the accurate determination of fibre endoscope location. The accuracy of the time gating may define the successful suppression of non-ballistic photons, and therefore the accuracy of locating the endoscope tip.

In principle, all of the photons that pass through the tissue into the detector 16 (including ballistic photons, snake photons and highly scattered photons) could be used to form an image. However, in many cases the optical fibre could be located in such an image only with very low spatial resolution. The accuracy of a determination of the location that uses all photons received by the detector 16 may be low. By using only ballistic photons, snake photons, or a combination of ballistic and snake photons, the optical fibre may be located with much higher spatial resolution.

By using time-resolved measurement of light received from the optical fibre, improved knowledge of a fibre endoscope location may be obtained. Improved knowledge of the fibre endoscope location may be important in multiple scenarios. For example, improved location of the endoscope may be important in determining the location of observed abnormal tissue, for example the location of abnormal tissue observed by endoscope imaging or abnormal tissue collected by biopsy. Improved location of the endoscope may be important for effective sampling of multiple regions of an organ. With improved location of the endoscope, it may be easier to ensure that sampling is performed at the correct locations.

In order for accurate imaging of endoscope location with ballistic or snake photons a very sensitive camera (detector 16) is used. The camera is capable of detecting the small number of photons, and indeed even smaller number of ballistic photons, exiting the tissue. Strong laser light filters may also be used on detection to remove photons of wavelengths other than the wavelength of interest.

In the present embodiment, a single photon detector array is used, such as those based on CMOS SPADs. Spatial information is required to form an image. In the present embodiment, that spatial information is provided by the detector array. Photons striking different detector elements of the detector array arrive from different positions in space.

However, in other embodiments, a single detector is used rather than an array of detectors. The single detector may be a higher performance single point single photon detector. Spatial information may be obtained using a scanning imaging system.

In one embodiment, the detector 16 is a single detector, and the apparatus further comprises a scanning system configured to vary the position of the detector over time, or to adjust a lens or imaging system to vary the location light is collected from. A variation of position may be such that different pulses are received at different detector positions. A variation of a lens or imaging system may be such that, although the detector does not move, it receives light from different positions at different times. The results from the different positions may then be combined to form an image. A variation of position may be by small increments comparable to or smaller than the pixel size of the detector array. The scanning detector may therefore be capable of acquiring a high-resolution image. In other embodiments, any suitable means of acquiring spatial information for the detected photons may be used.

In the embodiment described above with reference to FIG. 1, light is emitted only from the end of the optical fibre. In other embodiments, a similar principle may be extended to fibre length location. The optical fibre used may be such that photons are scattered out of the side of the fibre. An optical fibre may be used that is highly scattering along all of its length. Highly scattering fibres now exist for the purposes of increasing the amount of side scattered light (e.g. Corning Fibrance).

In an embodiment, the detector 16 detects photons scattered from the length of the fibre (i.e. photons that are emitted out of the sides of the fibre) in addition to photons scattered from the tip of the fibre. Ballistic photons and/or snake photons may be used to determine a path of the optical fibre within the patient. The path of the optical fibre may appear as a gently curved line in an image formed by the processor 20.

The signal from photons emitted from the sides of the optical fibre may be much weaker than the signal from light emitted from the fibre end. In some embodiments, prior knowledge that the source is in the form of a line with gentle bends may allow advanced image processing techniques to be employed to reconstruct accurate images of the location of the fibre length. For example, image processing techniques may comprise a probabilistic atlas-based approach and/or optimisation of a restricted curve fit.

In some embodiments, an environment containing the system of FIG. 1 is illuminated with light at a different wavelength or wavelengths from the measurement wavelength (i.e. the wavelength of the photons that are detected by detector 16 and used to determine the location of the optical fibre). The environment may be a room in which endoscopy is performed, for example a hospital ward or operating theatre.

The number of photons from the optical fibre that are detected by the detector 16 is expected to be low. By illuminating the room with light that does not include the wavelength of the laser source that is supplying light to the optical fibre, a level of noise at the detected wavelength may be reduced. In some circumstances, if illumination of a different wavelength is used, substantially no photons in the TCSPC measurement band (the frequency band accepted by the detector) may be present in the room, other than those originating from the optical fibre. The use of a different wavelength for the light source than is used for illuminating the environment may lead to a reduction in noise (i.e. unwanted photons from other sources).

In some embodiments, the illumination of the environment is by light from fluorescent lamps. Endoscopy is often performed in rooms that are illuminated with overhead fluorescent light. Fluorescent lamps produce light that is perceived as being white, but that actually comprises discrete bands.

The light source is selected such that the light passing through the optical fibre has a wavelength that lies within a dark inter-band spectral region of the fluorescent lamps. The TCSPC measurements are then performed within the dark inter-band spectral regions.

By using a different wavelength for the light source than is used for illuminating the environment, the determining of a location for the optical fibre may be performed in a well-lit room and may not need to be performed in low light or darkness, even though the number of photons received by the detector 16 is expected to be small. This may be particularly useful in the case where the room is an operating theatre or other medical facility.

In the embodiments described above, light is emitted from the optical fibre positioned inside the body of the patient and is received by a detector positioned outside the patient. However, alternative embodiments exist in which light is emitted by a light source outside the patient and received by the optical fibre inside the patient.

In one such embodiment, light from a short pulse laser source is scanned across the body of a patient. For example, the light may be scanned across a two-dimensional region of the torso of a patient. An optical fibre is positioned inside the lung of the patient. Some light from the light source passes through the tissue of the patient and arrives in the optical fibre through the tip of the optical fibre. In the case of an optical fibre that is configured to emit through its sides, light may also arrive through the sides of the optical fibre.

A detector is coupled to the proximal end of the optical fibre (the end that is outside the patient). The detector may be, for example, a single photon detector. Photons arriving in the optical fibre are detected by the detector and turned into electrical signals. Their time of arrival is recorded. A position for each photon may also be determined from the position of the scanning light source at the time that photon was transmitted.

Signals are selected that correspond to ballistic photons and/or snake photons, for example by time gating or selecting signals in one or more time bins. The selected signals are used to form an image, which is used to determine a location of the optical fibre using the light that was transmitted into the optical fibre. In some circumstances, it may be beneficial to receive photons in the dark (i.e. inside the patient). In some circumstances, noise levels may be reduced by transmitting light from the outside to the inside of the patient, rather than transmitting light from the inside to the outside of the patient.

In the embodiments above, the location of an optical fibre in the lung of a human patient is determined. However, possible application may be much wider. An optical fibre may be positioned within any human or animal tissue in any suitable medical or veterinary application. For example, the optical fibre may be part of an endoscope that is delivered to the lungs, upper gastrointestinal tract, lower gastrointestinal tract or urinary tract of a human or animal subject. The optical fibre may be positioned inside any suitable organ or other tissue. In other embodiments, the optical fibre may be positioned inside a scattering material that does not comprise human or animal tissue.

In some embodiments, a method of locating an optical fibre using light emitted from that optical fibre (or received through the optical fibre) may be used to determine the location of a medical instrument in any one of a wide variety of medical applications.

An optical fibre for which a location is determined may be part of any suitable medical instrument, for example an endoscope or catheter delivery system. In some circumstances, the optical fibre may not be part of the medical instrument, but may be co-located with a part of the medical instrument. For example, an optical fibre may be placed in a catheter or along a guide wire. An optical fibre may be associated with any placeable device, for example any device that is to be implanted or otherwise delivered into the body. By determining a location of the optical fibre, a location of the medical instrument may also be determined. In one embodiment, the medical instrument comprises an energy source for ablation or modification of tissue.

There are many medical applications in which the location of a medical instrument positioned in the body may be determined. The methods described above may be used in any appropriate medical application, for example in training, endoscopy procedures, placement of stents or placement of catheters. For example, in training, the method of determining the location of an endoscope using light emitted from a fibre of the endoscope may be used to determine whether the endoscope has been placed correctly by the person who is training.

In current clinical practice, repeated X-rays may be used to determine the position of a device to be placed inside the body, such as a catheter. The device may be coated in a radiopaque material so that it is visible on X-rays. The repeated X-rays expose the patient to X-ray radiation. By instead using a method based on light to determine the position of the device, radiation exposure may be reduced. In some embodiments, a location determined using light emission may be overlaid with an X-ray image of the patient.

In some circumstances, the detector 16 may be used to obtain a real-time video of the location of an optical fibre, which may show the motion of the optical fibre as it is moved within a patient's body. The real-time video may allow a live feed to be displayed of where the optical fibre is located. The real-time video may be obtained without irradiation of the patient.

In some embodiments, the method of determining location using light emitted from the fibre is used in the context of automated surgery, for example robotic surgery. For example, a location determined using light may be used to verify a location of a medical instrument such as a scalpel that is operated robotically inside the body, for example during laparoscopic surgery.

Obtaining a location using emitted light may increase confidence in a procedure that is carried out within the body, for example a robotic procedure. It may be used to ascertain that a desired location has been reached. In procedures in which tissue samples are taken, it may be used to ensure that samples are taken from the desired sample location. In procedures in which multiple samples are to be taken, it may be used to ensure that the spacing of the multiple samples is as desired.

A first experimental demonstration has been performed using the system of FIG. 1 for proof of principle experiments in determining fibre location inside a scattering medium. In the first experimental demonstration, an optical fibre was suspended in milk (an emulsified colloid of liquid butterfat globules dispersed within a water-based solution, well known as a scattering medium). Imaging was performed with a 32×32 array of CMOS SPADs and a simple lens arrangement. The field of view was ~15 cm on each axis.

Figure 3A:
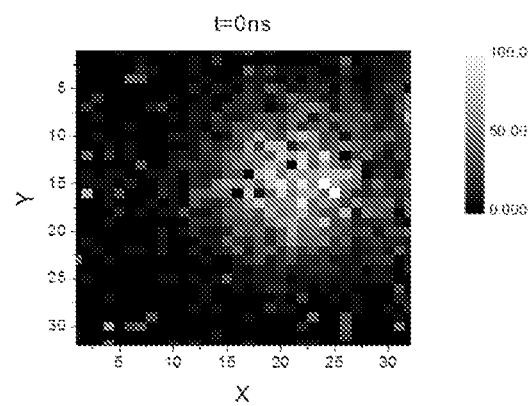
FIGS. 3a, 3b and 3c are plots of experimental results of determining fibre location inside a scattering medium at times of 0 ns, 2 ns, and 5.5 ns respectively.
Figure 3B:
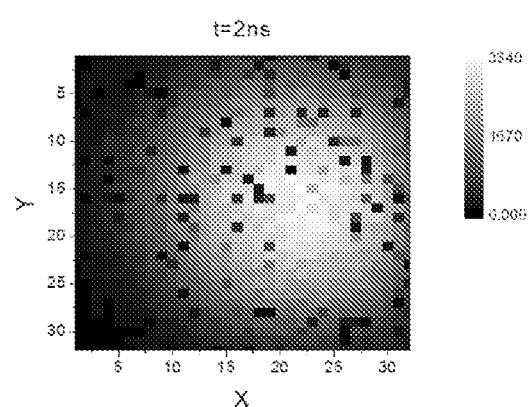
Figure 3C:
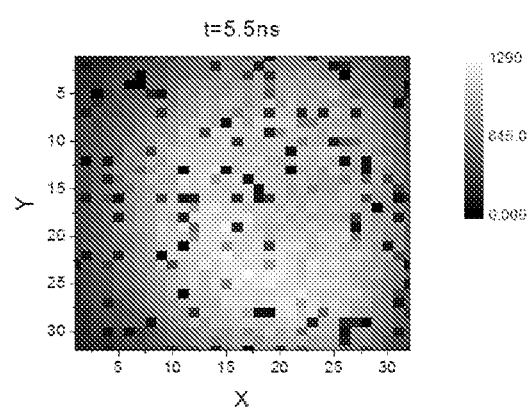

FIGS. 3a to 3c show experimental results of the first experimental demonstration. Images are formed at particular times relative to the arrival of the pulse, with t=0 being representative of the time of arrival of first photons of the pulse. FIG. 3a shows experimental results for a time bin at t=0 ns. FIG. 3a may be expected to include ballistic photons. FIG. 3b shows results for a time bin at t=2 ns. FIG. 3b may be expected to include snake photons. FIG. 3c shows experimental results for a time bin at t=5.5 ns. FIG. 3c may be expected to include photons with greater scattering than those of FIGS. 3a and 3b.

It may be seen that the bright region in FIG. 3a is smaller than that of FIG. 3b, and the bright region in FIG. 3b is smaller than that of FIG. 3c. As expected, the photons arriving later are distributed over a larger spatial region of the detector than those arriving earlier.

There is clear observation in FIGS. 3a to 3c of the lesser scattered light reaching the imaging detector at an early arrival time, while greater scattered light arrives later as expected. For comparison, a non-time resolved image of light scattered through the colloidal suspension (milk) is shown as FIG. 4. The non-time resolved image includes all photons (ballistic, snake and highly scattered) and does not use any time gating.

Figure 4:
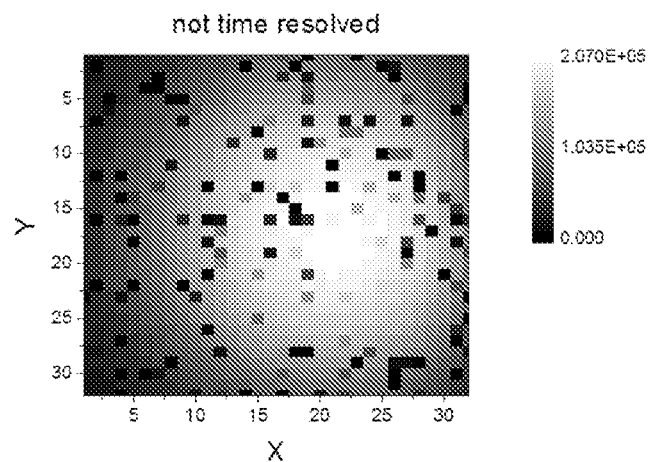
FIG. 4 is a non-time-resolved image of light scattered through a colloidal suspension.
Figure 5:
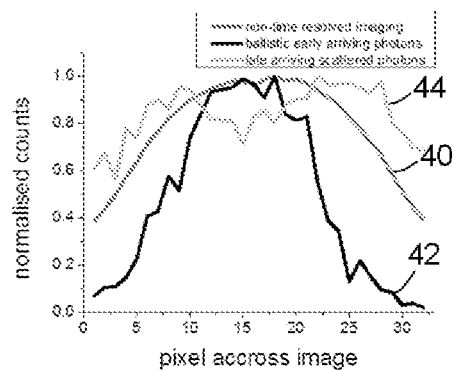
FIG. 5 plots a profile through time-resolved and non-time-resolved images.

FIG. 5 is a profile through different images to show the form of the scattered spot of light. Line 40 is the profile of the non-time-resolved image (FIG. 4). Line 42 is the profile of the ballistic early-arriving photons (FIG. 3a). Line 44 is the profile of the late-arriving scattered photons (FIG. 3c).

Figure 6:
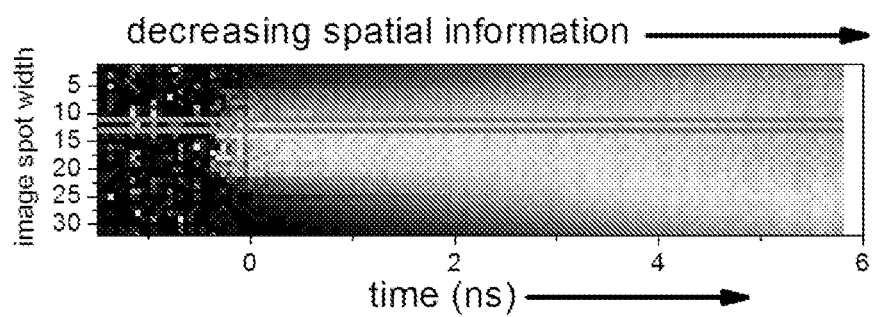
FIG. 6 is a profile of a scattered spot of light plotted against arrival time.

FIG. 6 shows the profile of the scattered spot of light plotted against arrival time. Amplitude is plotted on the z axis, profile on the vertical axis, and arrival time on the horizontal axis. It may be seen that the profile expands with time.

The first experimental demonstration had a field of view limited to 15 cm, which was chosen for practicality. Within the field of view, the non-time-resolved image (FIG. 4) shows a clear circular pattern, which could enable determination of the source of light. However, in many practical scenarios in which the system of FIG. 1 would be used, the scattering is expected to be much more complex than that observed in the first experimental demonstration. The complexity of the scattering may be due to the non-uniform nature of human tissue including bone. The complex scattering in the human body may be unlikely to yield a simple pattern on exiting the body. Therefore time-resolved imaging may be important for determining endoscope location.

In the first experimental demonstration, the source of the light is not actually exactly at the centre of the non-time-resolved image (FIG. 4), as the image is biased due to the directions of the original pulse in the plane of the image.

The scattering density of milk was not compared to human tissue. While the depth of milk used was of the order of the thickness of tissue in the lung cavity, for instance, it is expected that scattering properties of tissue may vary greatly. However, the first experimental demonstration was used as a proof of principle.

While the first experimental demonstration demonstrated the principle of ballistic photon imaging in a simple scattering material, endoscope location in real tissue may give more complex data due to highly different tissue properties including bones etc.

Figures 7A, 7B:
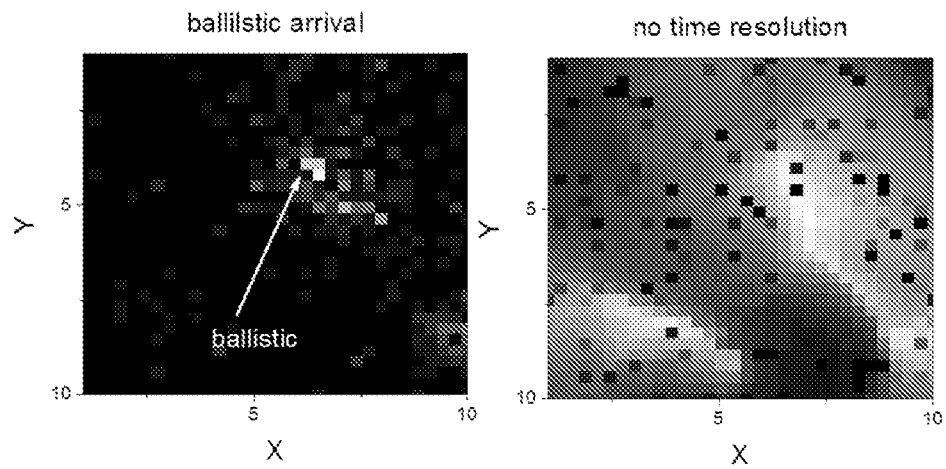
FIG. 7a is a ballistic photon image of light scattered through a whole chicken.
FIG. 7b is a non-time-resolved image of light scattered through a whole chicken.

A second experimental demonstration was performed using a whole chicken. FIG. 7a shows a ballistic photon image of light scattered through a whole chicken. Circle 50 is centred on the determined location of the endoscope tip in the ballistic image of FIG. 7a. FIG. 7b shows a non-time-resolved image of light scattered through the whole chicken.

Figures 8A, 8B:
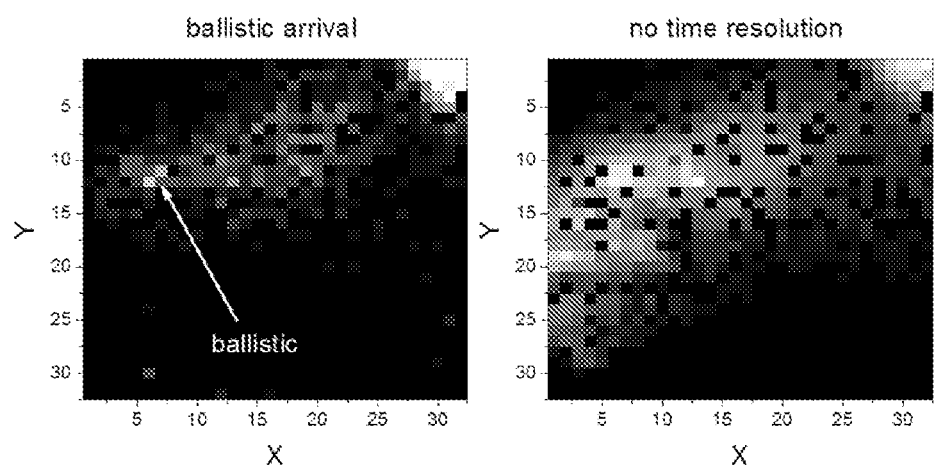
FIG. 8a is a ballistic photon image of light scattered through a sheep's lung and rib cage.
FIG. 8b is a non-time-resolved image of light scattered through a sheep's lung and rib cage.

A third experimental demonstration was performed using a sheep's lung and rib cage. FIG. 8a shows a ballistic photon image of light scattered through the sheep's lung and rib cage. Circle 52 is centred on the determined location of the endoscope tip in the ballistic image of FIG. 8a. FIG. 8b shows a non-time-resolved image of light scattered through the sheep's lung and rib cage.

The results of the second and third experimental demonstrations demonstrate that light escaping from complex tissue (FIGS. 7b and 8b) may not give a clear location of the endoscope tip. Meanwhile, ballistic photon images (FIGS. 7a and 8a) may give very clear endoscope tip location to within a centimetre in these early proof of principle experiments.

In the experiments of FIGS. 7a to 8b, it was found that much spatial information was lost after 1 ns. Snake photons may in some circumstances be those arriving before 0.5 ns. A non-time resolved image may be an image obtained from photons arriving in all time bins.

In the proof of principle experiments of FIGS. 7a to 8b, the field of view is 15 cm. The detector size is 32 pixels across. Ballistic photons were observed and located to a width of less than 2 pixels. Since each pixel has a width of approximately 0.5 cm, the resolution of the ballistic photon images may be considered to be one centimetre. In some circumstances, a resolution of the detection may be limited by the optical and detector resolution of the system. In some circumstances, a resolution of the detection may be limited by scattering statistics.

It may be understood that the present invention has been described above purely by way of example, and that modifications of detail can be made within the scope of the invention.

Each feature disclosed in the description and (where appropriate) the claims and drawings may be provided independently or in any appropriate combination.

The invention claimed is:

1. A method of determining a location of an optical fibre that is positioned at least partially inside a human or animal body, the method comprising the steps of:
   transmitting, from a light source, pulsed light into a proximal end of the optical fibre such that the pulsed light is guided along the optical fibre and emitted from the optical fibre into tissue of the human or animal body;
   transmitting, by the light sources, to a time-resolved single photon detector positioned outside the human or animal body, an electrical pulse when the pulsed light is transmitted into the proximal end;
   receiving, by the time-resolved single-photon detector positioned outside the human or animal body, photons of the pulsed light that have passed through the tissue of the human or animal body after having been emitted from the optical fibre;

receiving, at the time-resolved single-photon detector, the electrical pulse from the light source;

producing, by the time-resolved single-photon detector, signals corresponding to the received photons, wherein, for each of the received photons, the signal representative thereof includes a position and a time of arrival, wherein producing said signals comprises starting or stopping timing based on the reception of the electrical pulse so that the time of arrival represents a difference between a time of transmission of a pulse in which the photon originated and a time at which the photon was received, and wherein the produced signals represent at least ballistic photons, snake photons, and highly scattered photons each originating from the pulsed light emitted from the optical fiber and having passed through the tissue of the human or animal body;

receiving, by a processor, the signals from the time-resolved single-photon detector;

selecting, by the processor, signals corresponding to some of the received photons wherein the selecting comprises:

selecting first signals having a time of arrival within a first time interval, the first selected signals representing ballistic photons or a combination of ballistic photons and snake photons, selecting second signals having a time of arrival within a second, different time interval, the second selected signals representing snake photons, and discarding signals representing at least the highly scattered photons; and determining a location of the optical fibre within the human or animal body based on the selected signals, wherein the determining of the location of the optical fibre based on the selected signals comprises:

forming a first image using the first selected signals, forming a second image using the second selected signals, and determining the location of the optical fibre within said human or animal body based on a combination of the first image and the second image.

2. The method according to claim 1, wherein the optical fibre is configured to transmit the pulsed light into the human or animal body from a distal tip of the optical fibre and/or through at least part of a side of the optical fibre.

3. The method according to claim 1, wherein the optical fibre is configured to transmit the pulsed light into the tissue of the human or animal body through at least part of a side of the optical fibre, and the determining of the location of the optical fibre comprises applying shape-based image processing techniques to the image to determine a location of at least part of the side of the optical fibre.

4. The method according to claim 1, wherein the pulsed light comprises narrow band laser light.

5. The method according to claim 1, further comprising filtering the received photons using a filter, wherein the filter is configured to transmit photons at a wavelength of the pulsed light.

6. The method according to claim 1, further comprising illuminating, with light having a wavelength spectrum that does not include a wavelength of the pulsed light, an environment in which the human or animal body is placed.

7. The method according to claim 1, wherein the single-photon detector comprises at least one SPAD (single photon avalanche diode).

8. The method according to claim 1, wherein:
the optical fibre is part of or is co-located with at least one medical instrument, and
the method further comprises determining a location of at least part of the medical instrument based on the determined location of the at least part of the optical fibre.

9. The method according to claim 8, wherein the medical instrument comprises at least one of an endoscope, a guide wire, a catheter, a catheter delivery system, a scalpel, or an energy source for ablation or modification of tissue.

10. The method according to claim 8, wherein:
the medical instrument is placed inside the human or animal body using an automated procedure, and
the determining of the location of the medical instrument comprises a verification of the automated procedure.

11. The method according to claim 1, the method further comprising using the signals corresponding to the selected photons to determine a tissue type of at least part of the tissue of the human or animal body.

* * * * *